United States Patent [19]

Bennett

[11] 4,008,569
[45] Feb. 22, 1977

[54] GAS TURBINE ENGINE

[75] Inventor: Harry Wrighton Bennett, Duffield, England

[73] Assignee: Rolls-Royce (1971) Limited, London, England

[22] Filed: Nov. 24, 1975

[21] Appl. No.: 634,754

[30] Foreign Application Priority Data

Dec. 3, 1974 United Kingdom ............ 52181/74

[52] U.S. Cl. ................................ 60/39.51 H; 165/8
[51] Int. Cl.² ...................... F02C 7/10; F23L 15/02
[58] Field of Search ............... 60/39.51 R, 39.51 H; 165/8, 4, 6, 9

[56] References Cited

UNITED STATES PATENTS 2,911,197  11/1959  Scherenberg .................... 165/8
3,177,661  4/1965   Hasbrouck .................. 60/39.51 H

FOREIGN PATENTS OR APPLICATIONS 710,536  6/1965  Canada .................... 60/39.51 R Primary Examiner—Carlton R. Croyle
Assistant Examiner—Louis J. Casaregola
Attorney, Agent, or Firm—Cushman, Darby & Cushman

[57] ABSTRACT

A gas turbine engine is provided with a novel heat exchanger which exchanges heat between the compressor delivery air and turbine exhaust gas. The exchanger comprises a stack of rotary discs angled to produce two sets of wedge-shaped flow areas between them; turbine exhaust gases flow through the discs from one set of areas to the other and heat the discs, while the compressor delivery air flows through a segment of the discs in the reverse direction to exhaust the heat.

8 Claims, 4 Drawing Figures

GAS TURBINE ENGINE

This invention relates to a gas turbine engine.

Recently the increased price of fuel oils has lead to a greater concentration on ways to reduce the fuel consumption of aircraft gas turbine engines. Engines at the present state of the art cannot be given greatly improved fuel consumption by the previously used expedient of increasing maximum cycle temperature and pressure, and consideration has been given to the provision of regenerative heat exchangers used to heat compressor delivery air with the waste heat from the turbine exhaust gases. However, these arrangements have hitherto been too bulky and produced too much drag to be used in aircraft gas turbines.

The present invention provides a gas turbine engine having a heat exchanger in a relatively compact and convenient form.

According to the present invention a gas turbine engine comprises a compressor, combustion equipment and a turbine, the compressor and turbine being drivingly interconnected, and a heat exchanger adapted to exchange heat between the compressor delivery air and the turbine exhaust, in which the heat exchanger comprises a plurality of rotatable regenerator discs whose axes are angled in alternate directions so that the discs define between them a plurality of wedge-shaped flow areas, drive means adapted to rotate the discs, first duct means adapted to allow turbine exhaust gases to flow into a first set of said flow areas, through at least part of each disc and through a second set of said flow areas to an exhaust nozzle, and second duct means adapted to direct compressor delivery air to flow in contra-flow to and separated from the exhaust gas through a segment of each disc and to said combustion equipment.

Preferably the discs are mounted with their axes lying in one plane which preferably also contains the axis of the compressor and turbine.

The angles of the discs are preferably such as to cause adjacent discs to nearly touch at their peripheries.

In a preferred embodiment the second duct means is mounted around the edge of the discs remote from the turbine, and the segment through which the compressor delivery air flows is again remote from the turbine.

The invention will now be particularly described, merely by way of example, with reference to the accompanying drawings, in which.

Figure 1:
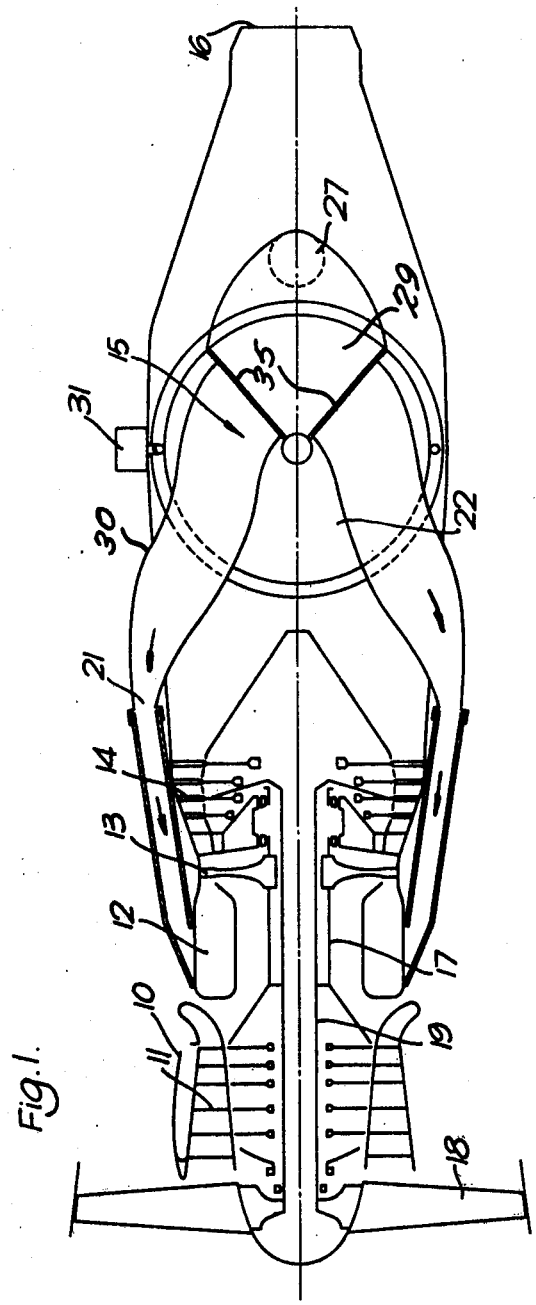
FIG. 1 is a diagrammatic vertical axial section through a gas turbine engine in accordance with the invention.
Figure 2:
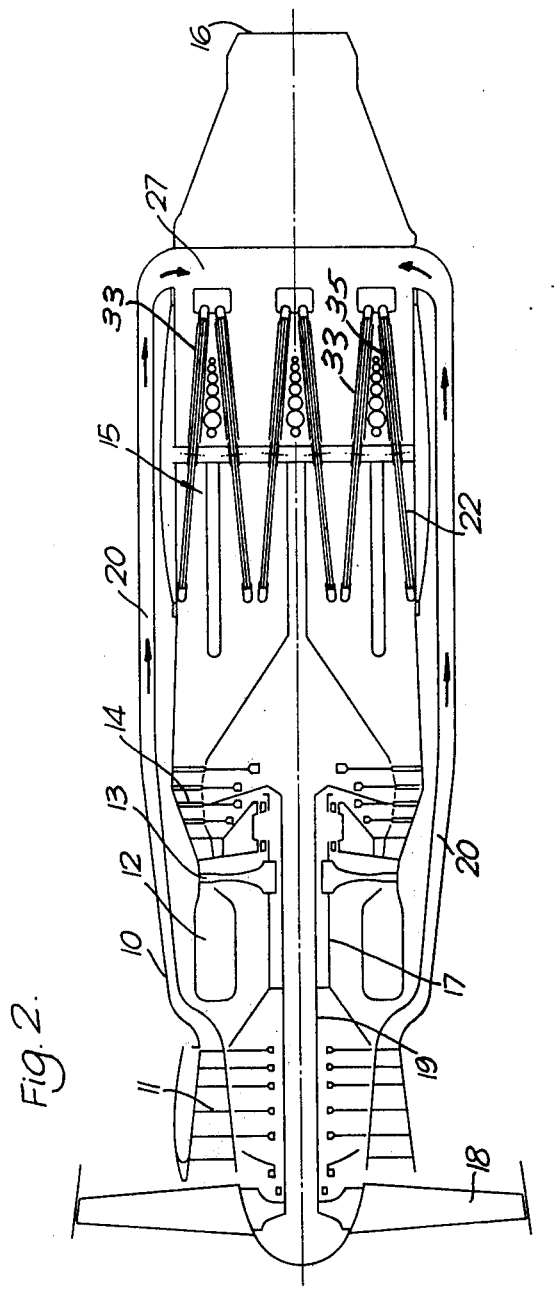
FIG. 2 is a diagrammatic horizontal axial section through the engine of FIG. 1.

In FIG. 1 there is shown a gas turbine engine comprising a casing 10 within which are disposed a compressor 11, combustion chamber 12, high pressure turbine 13, low pressure turbine 14, heat exchanger 15 and final nozzle 16. The compressor 11 and the high pressure turbine 13 are drivingly interconnected by a high pressure shaft 17 while the low pressure turbine drives a fan 18 by way of a low pressure shaft 19.

A series of ducts 20 feed compressor delivery air to the heat exchanger 15, while a further series of ducts 21 return this air from the exchanger to the combustion chamber 12.

Figure 3:
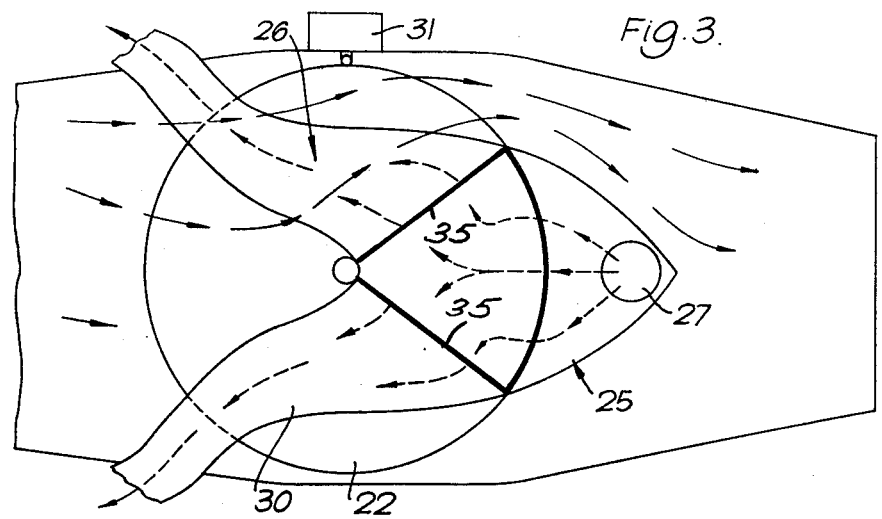
FIG. 3 is an enlarged diagrammatic view of the heat exchanger as shown in FIG. 1, modified to indicate the gas flow.
Figure 4:
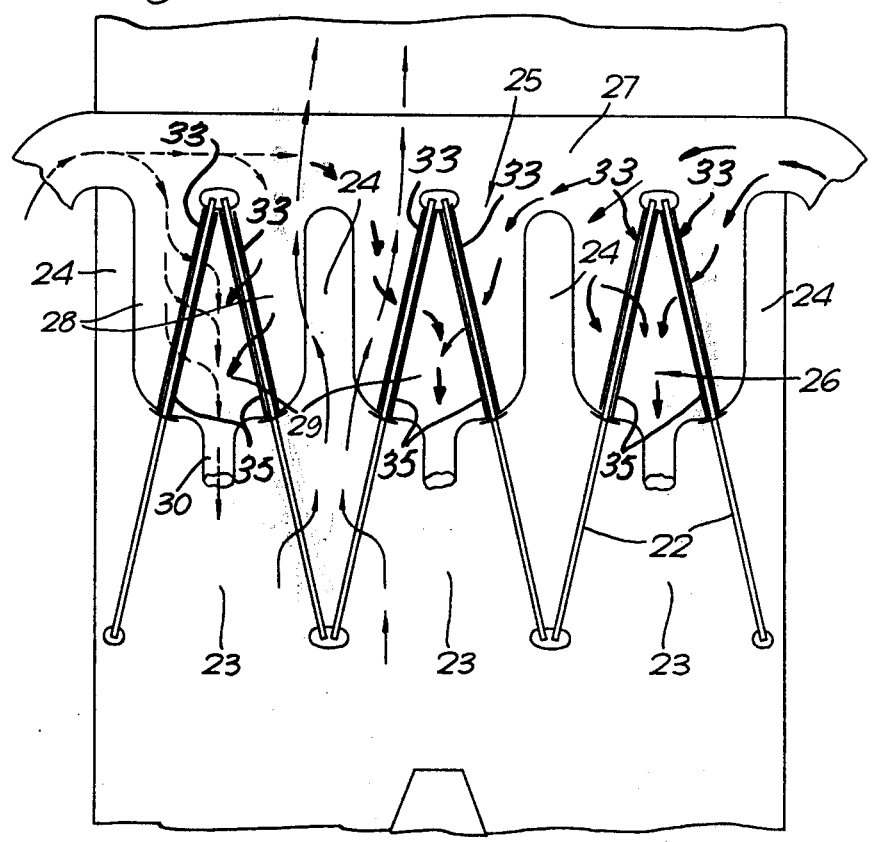
FIG. 4 is an enlarged diagrammatic view of the heat exchanger as shown in FIG. 2, modified to indicate the gas flow and oriented 90° with respect to the heat exchanger shown in FIG. 2.

The detail construction of the exchanger 15 is most easily seen from FIGS. 3 and 4 of the drawings, and it will be seen that the exchanger basically comprises six discs 22 which are mounted in a stack whose axis extends across the exhaust duct of the engine. The separate discs are not mounted coaxial with the stack, but have their axes askew in the horizontal plane so that the peripheries of adjacent discs almost touch at alternate ends of their intersection with the horizontal plane. The centres of the discs lie on a line which is perpendicular to the axis of the compressor 11 and turbine 13, and their axes lie in a plane containing this latter axis. The discs thus form between themselves wedge-shaped flow areas, of which the areas 23 lie on the engine side of the discs and the areas 24 lie on the exhaust nozzle side of the discs. Each of the discs is mounted in bearings at its periphery to allow its rotation about its axis and is provided with drive means indicated at 31 to rotate it about its axis.

The discs 22 may be made of any of the materials conventionally used for heat exchanger matrices, and as will be understood, the material used must allow the gases to flow through the disc in an axial direction only of the discs 22, must be able to withstand the high temperature of the gases, and must have sufficient thermal capacity to store the necessary amount of heat.

An inlet manifold 25 and an outlet manifold 26 are provided to carry the compressor delivery gases through the discs. The inlet manifold 25 comprises a duct portion 27 which extends across the exhaust duct of the engine and is connected at its ends to the inlet ducts 20, and a plurality of segmental portions 28 which extend into the flow areas 24 and are sealed as indicated diagrammatically at 33 to the exposed faces of the discs to allow air to flow through a segmental portion of the disc 22.

The outlet manifold 26 which is located in the flow areas 23 comprises a plurality of segmental portions 29 which are sealed as indicated diagrammatically at 35 to the discs round segmental areas which correspond with the areas round which the portions 28 are sealed to the disc but which lie on the opposite faces of the discs. The segmental portions 29 bifurcate to form ducts 30 which feed into the ducts 21.

To complete the exchanger, shields (not shown) are provided which prevent the exhaust gases from the turbine flowing from the areas 23 into the areas 24 without flowing through the discs, and which also prevent recirculation of the exhaust gas round the outside of the discs.

Operation of the engine is as follows: air enters the engine to be compressed by the fan 18. Part of this air flows round the outside of the casing 10 to provide propulsive thrust, while the remainder enters the compressor 11 and is compressed. Delivery air from the compressor flows through the ducts 20 to the exchanger 15 where it enters the inlet manifold 25, is divided amongst the segmental portions 28 and flows through each of the rotating discs 22. These discs are hot, as explained below and they give up some heat to the air in its passage through the discs. The air then enters the segmental portions 29 and flows through the bifurcated ducts 30 and ducts 21 to the combustion chamber 12.

In the combustion chamber, fuel is burnt in the heated compressor delivery air, and the hot gases from the combustion chamber flow through the turbine 13 to drive the compressor 11 and through the turbine 14 to drive the fan 18. Exhaust gases from the turbines flow into the areas 23 and through the discs 22 into the areas 24, the shields mentioned above preventing the gases by-passing the discs and the manifolds from the compressor delivery air preventing mixing of the two gas flows.

In passing through the discs the turbine gases heat those portions through which they flow and the exhaust gases themselves are relatively cool when they leave the exchanger. The heat transferred to the discs is transported by the relatively slow disc rotation to heat the compressor delivery gases as described above.

The exhaust gases then leave the exchanger and flow through the final nozzle 16 to provide propulsive thrust.

It will be seen that by forming the heat exchanger from discs mounted in the above manner a compact system is provided in which the only extra ducting required is that for the compressor delivery gases, and in which the turbine exhaust flows virtually straight through the exchanger with quite small aerodynamic losses.

It will be understood that a number of variations could be made on the embodiment described. Thus the number and angle of discs could be varied, and they could be mounted in a stack at a different angle to the engine axis. The drive for the discs could be mechanical or aerodynamic and the engine itself could be a fan engine as described or it could be a straight jet or a shaft drive engine.

I claim:

1. A gas turbine engine comprising a compressor, combustion equipment and a turbine, the compressor and turbine being drivingly interconnected, and a heat exchanger adapted to exchange heat between the compressor delivery air and the turbine exhaust, said heat exchanger comprising a plurality of rotatable regenerator discs whose axes are angled in alternate directions so that the discs define between them a plurality of wedge-shaped flow areas, drive means adapted to rotate the discs, first duct means adapted to allow turbine exhaust gases to flow into a first set of said flow areas, through at least part of each disc and through a second set of said flow areas, an exhaust nozzle connected to receive the turbine exhaust gases flowing through said second set of flow areas, and second duct means adapted to direct compressor delivery air to flow in contra-flow to, and separated from, the turbine exhaust gas through a segment of each disc and to said combustion equipment.

2. A gas turbine engine as claimed in claim 1 and in which said disc are mounted with their axes lying in one plane which also contains the axis of the compressor and turbine.

3. A gas turbine engine as claimed in claim 2 and in which said discs are mounted with their centres lying in a line perpendicular to the axis of the compressor and turbine.

4. A gas turbine engine as claimed in claim 1 and in which the angles of the discs are such as to cause adjacent discs to almost touch at one point of their peripheries.

5. A gas turbine engine as claimed in claim 1 and comprising segmental manifold portions adapted to cause compressor delivery air to flow through segments of the discs remote from the turbine, said second duct means directing the compressor delivery air to flow to said segmental manifold portions.

6. A gas turbine engine as claimed in claim 5 and in which said second duct means comprise feed ducts running outside the gas flow path of the engine, a manifold pipe connected to said ducts and extending across the exhaust duct downstream of said discs, said manifold pipe being connected to said manifold portions which extend into said second set of flow areas and cause the air to flow through said discs.

7. A gas turbine engine as claimed in claim 6 and in which said second duct means includes a further set of manifold portions which extend within said first set of flow areas to collect the compressor delivery air which has passed through the discs and return ducts connected to said further portions and extending outside the gas flow path of the engine to feed the air to the combustion section.

8. A gas turbine engine as claimed in claim 1 and comprising a further turbine and a fan drivingly interconnected therewith, said fan being adapted to compress air at least part of which by-passes the compressor, combustion equipment and turbine.

* * * * *